(12) United States Patent
Oda et al.

(10) Patent No.: US 8,503,966 B2
(45) Date of Patent: Aug. 6, 2013

(54) SEMICONDUCTOR INTEGRATED CIRCUIT AND RECEIVING APPARATUS

(75) Inventors: Shoko Oda, Tokyo (JP); Jun Deguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 120 days.

(21) Appl. No.: 13/229,963

(22) Filed: Sep. 12, 2011

(65) Prior Publication Data

US 2012/0242414 A1    Sep. 27, 2012

(30) Foreign Application Priority Data

Mar. 23, 2011    (JP) ................................. 2011-064572

(51) Int. Cl.
*H04B 1/28* (2006.01)
*H04B 1/16* (2006.01)

(52) U.S. Cl.
USPC ............ 455/334; 455/296; 455/333; 330/252

(58) Field of Classification Search
USPC ............... 455/63.1, 67.13, 232.1, 239.1, 296, 455/333, 334; 330/253, 254, 256, 257, 269
See application file for complete search history.

(56) References Cited

U.S. PATENT DOCUMENTS

| | | | |
|---|---|---|---|
| 5,945,878 A | 8/1999 | Westwick et al. | |
| 6,650,182 B2 * | 11/2003 | Kim et al. | 330/252 |
| 8,121,579 B2 * | 2/2012 | Shiramizu et al. | 455/334 |
| 8,324,956 B2 * | 12/2012 | Chee et al. | 327/355 |
| 2004/0137870 A1 | 7/2004 | Kivekas et al. | |

FOREIGN PATENT DOCUMENTS

| | | |
|---|---|---|
| JP | 52-135653 | 11/1977 |
| JP | 57-053114 | 3/1982 |
| JP | 02-060213 | 2/1990 |
| JP | 04-020006 | 1/1992 |
| JP | 2006-186696 | 7/2006 |

OTHER PUBLICATIONS

Translation of Official Action of Notification of Reason for Rejection for Japanese Patent Application No. 2011-064572 Dated May 31, 2013, 5 pgs.

* cited by examiner

*Primary Examiner* — Quochien B Vuong
(74) *Attorney, Agent, or Firm* — Turocy & Watson, LLP

(57) ABSTRACT

According to one embodiment, a semiconductor integrated circuit has a transconductance circuit, a first load circuit, and a second load circuit. The transconductance circuit has a first current generator configured to generate a first current depending on an input voltage, and a second current generator configured to generate a second current depending on the input voltage. The first load circuit has a first load configured to output a first output voltage depending on the first current from a first output terminal. The second load circuit has a second load configured to output a second output voltage depending on the second current from a second output terminal. At least one of the transconductance circuit, the first load circuit and the second load circuit comprises an impedance adjusting module configured to adjust impedance.

20 Claims, 13 Drawing Sheets

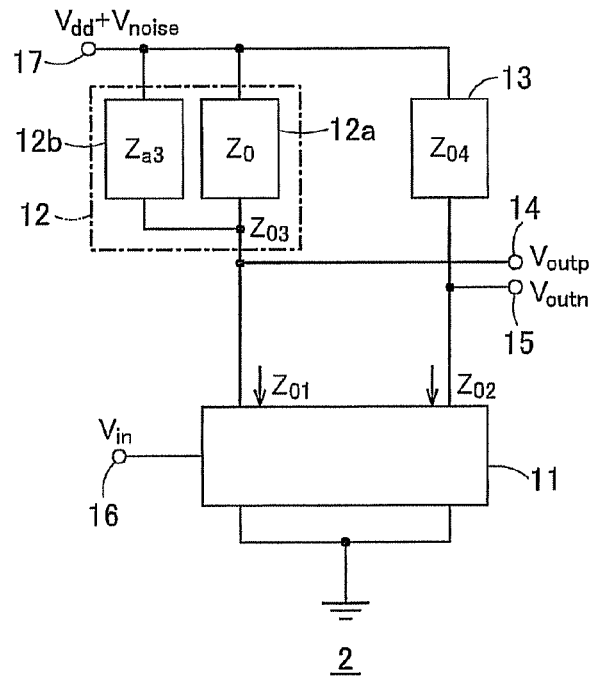

FIG.5

| LOAD 12a | IMPEDANCE ADJUSTING MODULE 12b | ABSOLUTE VALUE | PHASE |
|---|---|---|---|
| RESISTANCE ($\angle Z_0 = 0$) | RESISTANCE | DECREASE | NOT VARY |
| | COIL | DECREASE | INCREASE |
| | CAPACITOR | DECREASE | DECREASE |
| COIL ($\angle Z_0 > 0$) | RESISTANCE | DECREASE | DECREASE |
| | COIL | DECREASE | NOT VARY |
| | CAPACITOR | DECREASE | DECREASE |
| CAPACITOR ($\angle Z_0 < 0$) | RESISTANCE | DECREASE | INCREASE |
| | COIL | DECREASE | INCREASE |
| | CAPACITOR | DECREASE | NOT VARY |

FIG.6

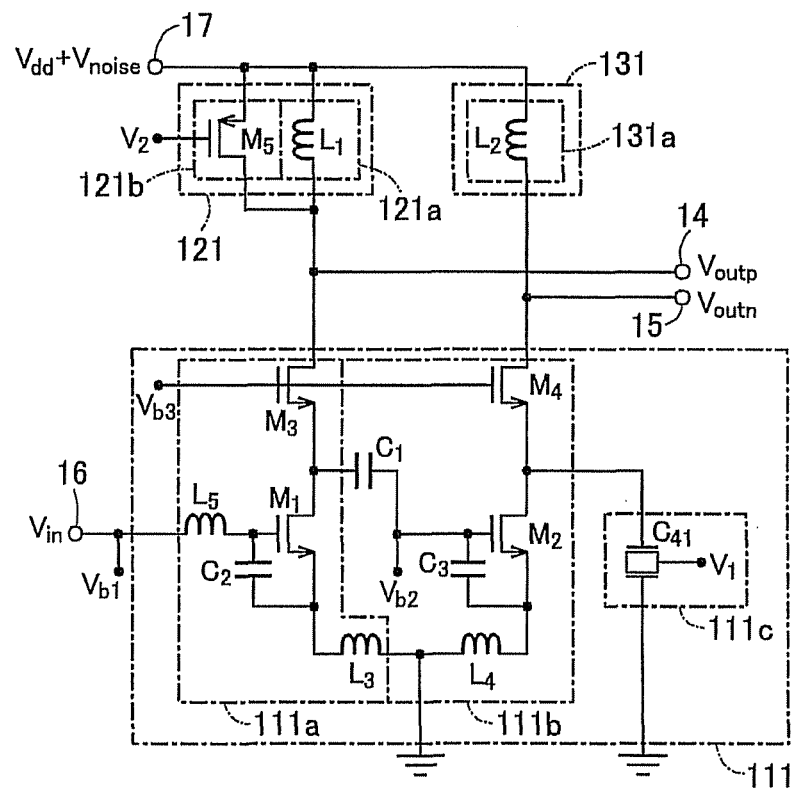
F I G. 12
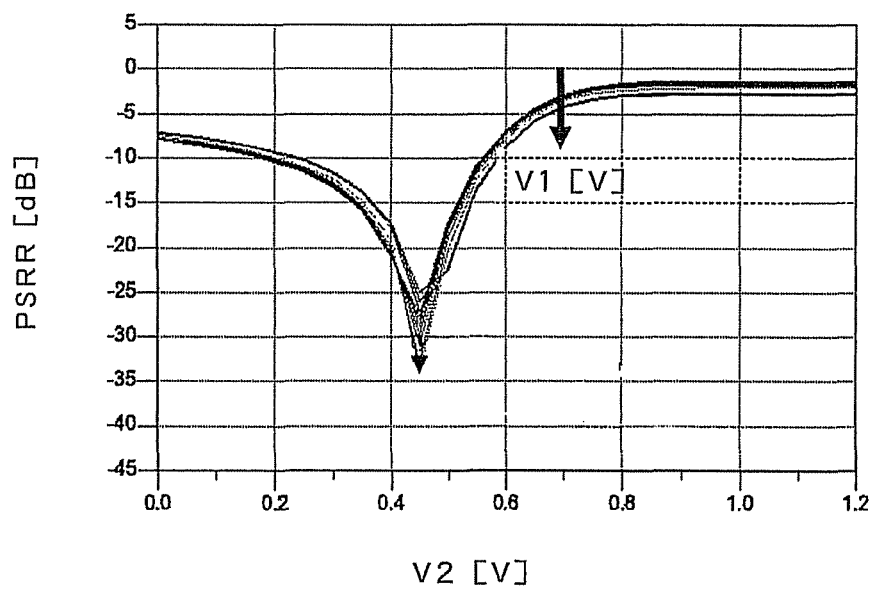
F I G. 13

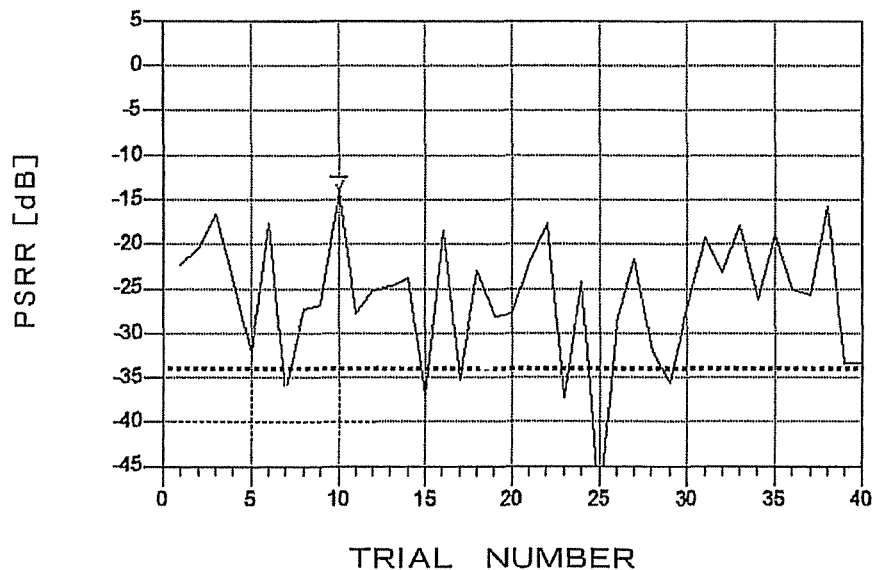
F I G. 14
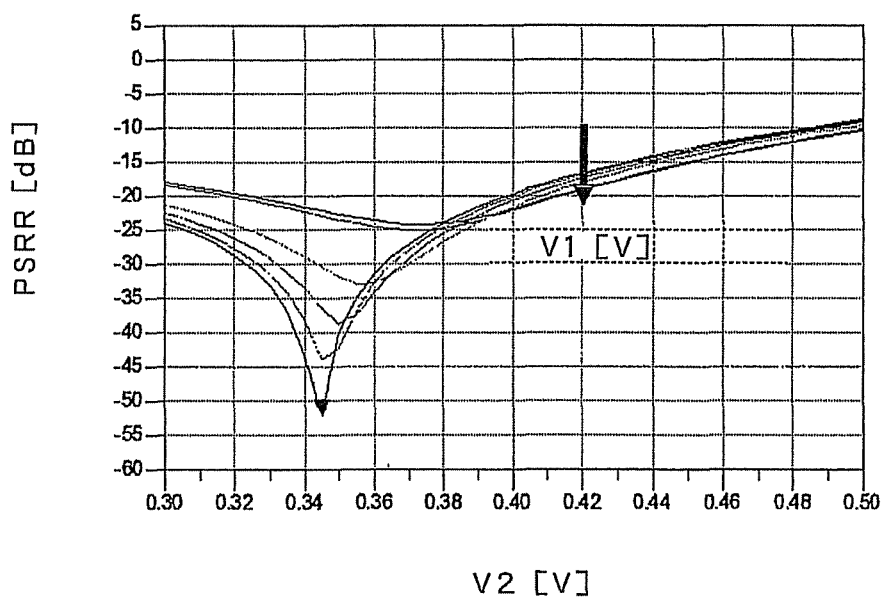
F I G. 15

US 8,503,966 B2

SEMICONDUCTOR INTEGRATED CIRCUIT AND RECEIVING APPARATUS

CROSS REFERENCE TO RELATED APPLICATIONS

This application is based upon and claims the benefit of priority from the prior Japanese Patent Application No. 2011-64572, filed on Mar. 23, 2011, the entire contents of which are incorporated herein by reference.

FIELD

Embodiments described herein relate generally to a semiconductor integrated circuit and a receiving apparatus.

BACKGROUND

SoC (System on Chip) including both digital and analog circuits has a problem that signals generated from the digital circuit and harmonics thereof affect the analog circuit through power supply lines and so on and noise performance of the analog circuit may degrade. For example, in a receiving apparatus, noise performance of LNA (Low Noise Amplifier), which is one of analog circuits, may degrade. Although it is one option to use a differential-input LNA in order to decrease influence of power supply noise, this increases assembly cost due to the increment of the input pins. Furthermore, it is difficult for the differential-input LNA to operate with low voltage because the differential-configuration needs a large voltage margin to generate a tail current source.

BRIEF DESCRIPTION OF THE DRAWINGS

FIG. 5 is a schematic block diagram of the LNA 2 in which the load circuit 12 is provided with the impedance adjusting module 12b.

FIG. 6 is a diagram collectively showing variation of the impedance $Z_{o3}$ when the impedance adjusting module 12b is connected to the load 12a.

FIG. 12 is a circuit configuration showing an example of the LNA 21.

FIG. 13 is a simulation result showing the characteristics of the LNA 21 in FIG. 12.

FIG. 14 is a Monte Carlo simulation result of the PSRR when there is variation of elements.

FIG. 15 is a simulation result showing the characteristics of the LNA 21 of the trial number 10.

DETAILED DESCRIPTION

In general, according to one embodiment, a semiconductor integrated circuit has a transconductance circuit, a first load circuit, and a second load circuit. The transconductance circuit has a first current generator configured to generate a first current depending on an input voltage, and a second current generator configured to generate a second current depending on the input voltage. The first load circuit has a first load configured to output a first output voltage depending on the first current from a first output terminal. The second load circuit has a second load configured to output a second output voltage depending on the second current from a second output terminal. At least one of the transconductance circuit, the first load circuit and the second load circuit comprises an impedance adjusting module configured to adjust impedance in such a manner that a parameter "P" shown in a following equation decreases, $$P = Z_{o1} * Z_{o4} - Z_{o2} * Z_{o3}$$

where, the $Z_{o1}$ is impedance of the transconductance circuit seen from the first output terminal, the $Z_{o2}$ is impedance of the transconductance circuit seen from the second output terminal, the $Z_{o3}$ is impedance of the first load circuit, and the $Z_{o4}$ is impedance of the second load circuit.

Hereinafter, embodiments of a semiconductor integrated circuit and a receiving apparatus will be specifically described with reference to the drawings.

(First Embodiment)

Figure 1:
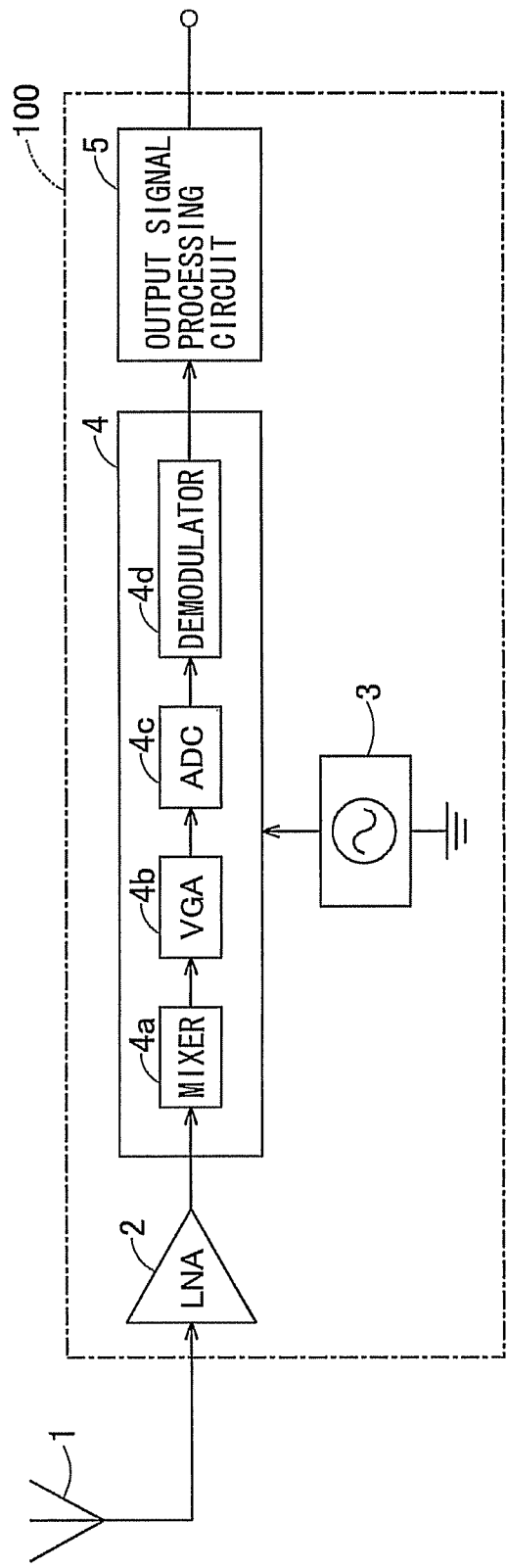
FIG. 1 is a schematic block diagram of a receiving apparatus 100 according to a first embodiment.

FIG. 1 is a schematic block diagram of a receiving apparatus 100 according to a first embodiment. The receiving apparatus 100 includes an LNA (semiconductor integrated circuit) 2, an LO (Local Oscillator) signal generator 3, a demodulation circuit 4, and an output signal processing circuit 5. The receiving apparatus 100 is, for example, an apparatus which is mounted on a wireless LAN (Local Area Network) device and which processes a radio signal received by an antenna 1 and outputs the processed signal to the outside.

The LNA 2 amplifies the radio signal received by the antenna 1. The LO signal generator 3 generates an LO signal used as a reference to demodulate the radio signal. The frequency of the LO signal is, for example, 2.5 GHz. The demodulation circuit 4 demodulates the amplified radio signal on the basis of the LO signal. More specifically, the demodulation circuit 4 includes a mixer 4a, a VGA (Variable Gain Amplifier) 4b, an ADC (Analog to Digital Converter) 4c, and a demodulator 4d. The mixer 4a performs frequency conversion of the radio signal amplified by the LNA 2. The VGA 4b amplifies the frequency-converted radio signal. The ADC 4c converts the radio signal into a digital signal. The demodulator 4d demodulates the converted radio signal. The output signal processing circuit 5 processes the demodulated signal and outputs the processed signal to the outside.

The demodulator 4d and the output signal processing circuit 5 are digital circuits, and noise generated by these circuits propagates to the LNA 2 via coupling between wires or the like in the receiving apparatus 100, and thus, the power supply voltage of the LNA 2 may vary. The LNA 2 is provided at the front end of the receiving apparatus 100. Thus, if the LNA 2 is affected by power supply noise, noise performance of the entire receiving apparatus 100 degrades. For example, when power supply rejection ratio (hereinafter referred to as PSRR, described below in detail) of the LNA 2 is −20 dB and the gain of VGA 4b is 70 dB, even if variation of the power supply voltage of the LNA 2 is only 1 mV, variation of the output signal is 0.3 V (+3 dBm) and a desired wave is significantly degraded if the LNA 2 is used without change.

It is one general option to use a differential-input LNA. However, the LNA 2 is desired to be a single-end input circuit to suppress the increase of the number of pins and the increase of the chip area. Furthermore, for low voltage operation, the single-end configuration, which does not need an extra voltage margin to generate a tail current, is desirable.

Therefore, the present embodiment improves the PSRR of the LNA 2 having a single-end to differential conversion function for generating a differential output signal from a single-end input signal.

Figure 2:
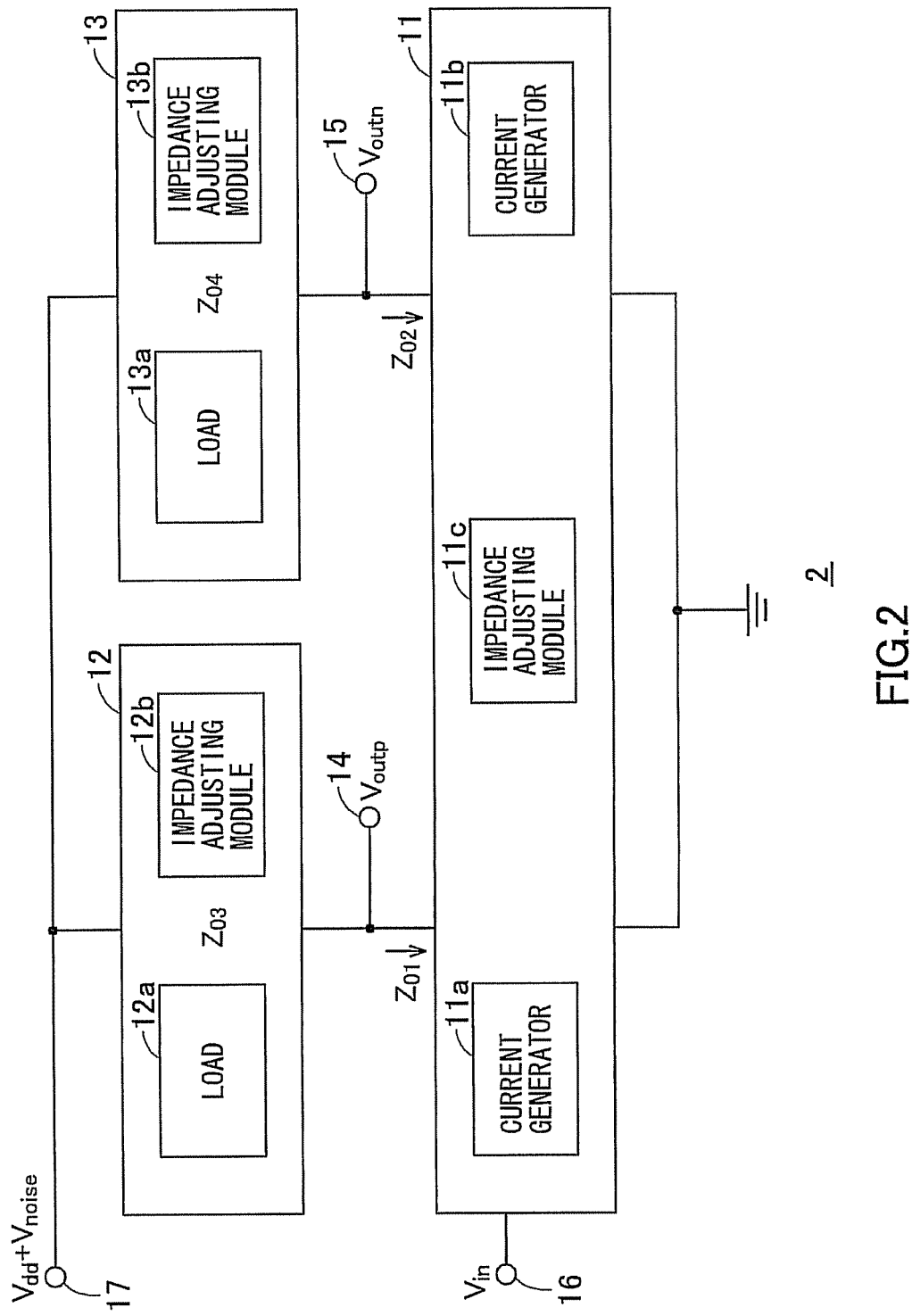
FIG. 2 is a schematic block diagram showing an example of an internal configuration of the LNA 2 according to the first embodiment.

FIG. 2 is a schematic block diagram showing an example of an internal configuration of the LNA 2 according to the first embodiment. The LNA 2 includes a transconductance circuit 11 having current generators 11a and 11b and an impedance adjusting module 11c, a load circuit (first load circuit) 12 having a load 12a and an impedance adjusting module 12b, and a load circuit (second load circuit) 13 having a load 13a and an impedance adjusting module 13b.

It is assumed that the impedance of the transconductance circuit 11 as seen from a positive output terminal (first output terminal) 14 which is a connection node between the transconductance circuit 11 and the load circuit 12 is $Z_{O1}$, the impedance of the transconductance circuit 11 as seen from a negative output terminal (second output terminal) 15 which is a connection node between the transconductance circuit 11 and the load circuit 13 is $Z_{O2}$, the impedance of the load circuit 12 is $Z_{O3}$, and the impedance of the load circuit 13 is $Z_{O4}$. The impedance adjusting modules 11c, 12b, and 13b adjust impedances $Z_{O1}$ to $Z_{O4}$ as described below.

In FIG. 2, an example where all of the transconductance circuit 11 and the load circuits 12 and 13 have the impedance adjusting modules is illustrated as an example. However, at least one of these needs to have the impedance adjusting module.

The transconductance circuit 11 generates differential current signals Ioutp and Ioutn according to an input voltage Vin inputted from an input terminal 16. More specifically, the current generator 11a generates a current signal Ioutp=gmp*Vin at the positive output terminal 14, and the current generator 11b generates a current signal Ioutn=gmn*Vin at the negative output terminal 15. Here, gmp and gmn are transconductances of the current generators 11a and 11b, respectively.

A power supply voltage Vdd is supplied to the load circuits 12 and 13 from a power supply terminal 17. The load circuit 12 outputs a positive output voltage Voutp from the positive output terminal 14, and the load circuit 13 outputs a negative output voltage Voutn from the negative output terminal 15. Power supply noise Vnoise affected from the output signal processing circuit 5 in FIG. 1 may be superimposed on the power supply voltage Vdd.

A voltage gain Vgain with respect to the input voltage Vin is as described below. Assuming that the power supply noise Vnoise =0, the impedances $Z_{O1}$ and $Z_{O3}$ can be assumed to be a parallel connection between the positive output terminal 14 and the ground terminal by a small signal equivalent circuit. A current Ioutp flows in the impedances $Z_{O1}$ and $Z_{O3}$, so that the positive output voltage Voutp is represented by the following equation (1).

$$Voutp = Ioutp*(Z_{O1}//Z_{O3}) = gmp*(Z_{O1}//Z_{O3})*Vin \quad (1)$$

Here, "//" indicates a parallel connection. Similarly, the negative output voltage Voutn is represented by the following equation (2).

$$Voutn = Ioutn*(Z_{O2}//Z_{O4}) = gmn*(Z_{O2}//Z_{O4})*Vin \quad (2)$$

Thus, the voltage gain Vgain is represented by the following equation (3).

$$Vgain = (Voutp - Voutn)/Vin = gmp*(Z_{O1}//Z_{O3}) - gmn*(Z_{O2}//Z_{O4}) \quad (3)$$

On the other hand, the PSRR, which is variation of the output signal voltage with respect to variation of the power supply voltage, is as described below. Assuming that the input voltage Vin=0, the positive output voltage Voutp and the negative output voltage Voutn with respect to the power supply noise Vnoise are represented by the following equations (4) and (5).

$$Voutp = Z_{O1}/(Z_{O1}+Z_{O3})*Vnoise \quad (4)$$

$$Voutn = Z_{O2}/(Z_{O2}+Z_{O4})*Vnoise \quad (5)$$

A difference between the positive output voltage Voutp and the negative output voltage Voutn is noise of the output signal. Thus, the PSRR is represented by the following equation (6).

$$PSRR = (Voutp - Voutn)/Vnoise = \frac{Z_{O1}*Z_{O4} - Z_{O2}*Z_{O3}}{(Z_{O1}+Z_{O3})*(Z_{O2}+Z_{O4})} \quad (6)$$

The smaller the PSRR is, the more difficult it is to receive influence of the noise of the power supply voltage. In particular, in the case of the following equation (7), the PSRR can be zero.

$$Z_{O1}*Z_{O4} - Z_{O2}*Z_{O3} = 0 \quad (7)$$

The impedances $Z_{O1}$ to $Z_{O4}$ are complex numbers. Thus, at least one of the impedances $Z_{O1}$ to $Z_{O4}$ is adjusted by the impedance adjusting modules so that the absolute value and the phase of $Z_{O1}*Z_{O4}$ are the same as those of $Z_{O2}*Z_{O3}$. If it is difficult to accurately adjust the impedances so that the absolute value and the phase of $Z_{O1}*Z_{O4}$ are the same as those of $Z_{O2}*Z_{O3}$, the impedance adjusting modules may be provided so that a parameter $P = Z_{O1}*Z_{O4} - Z_{O2}*Z_{O3}$ becomes small.

Figure 3A:
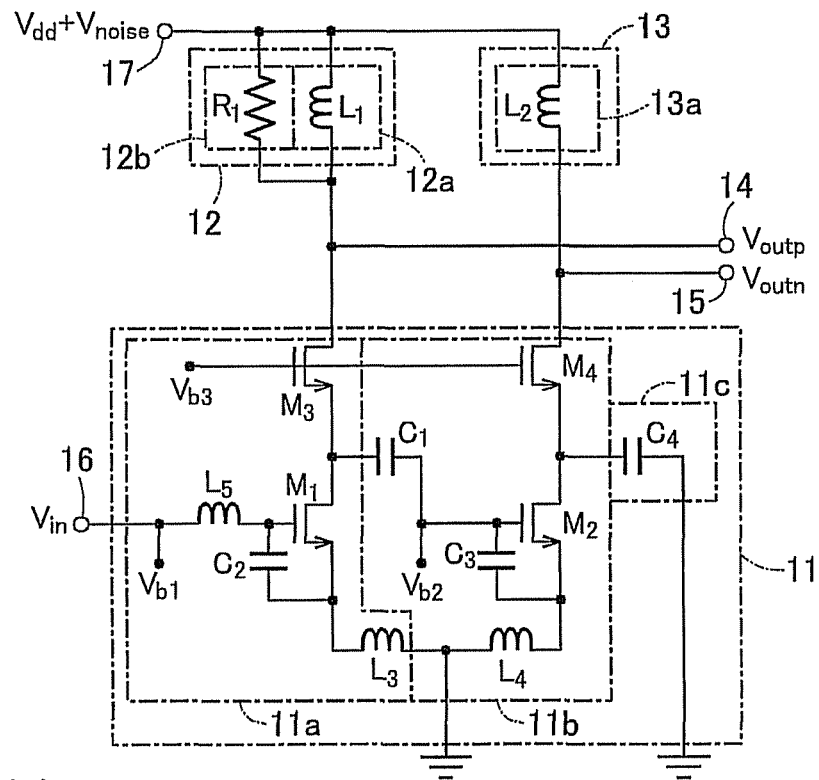
FIGS. 3A and 3B are a circuit configuration showing an example of the LNA 2.
Figure 3B:
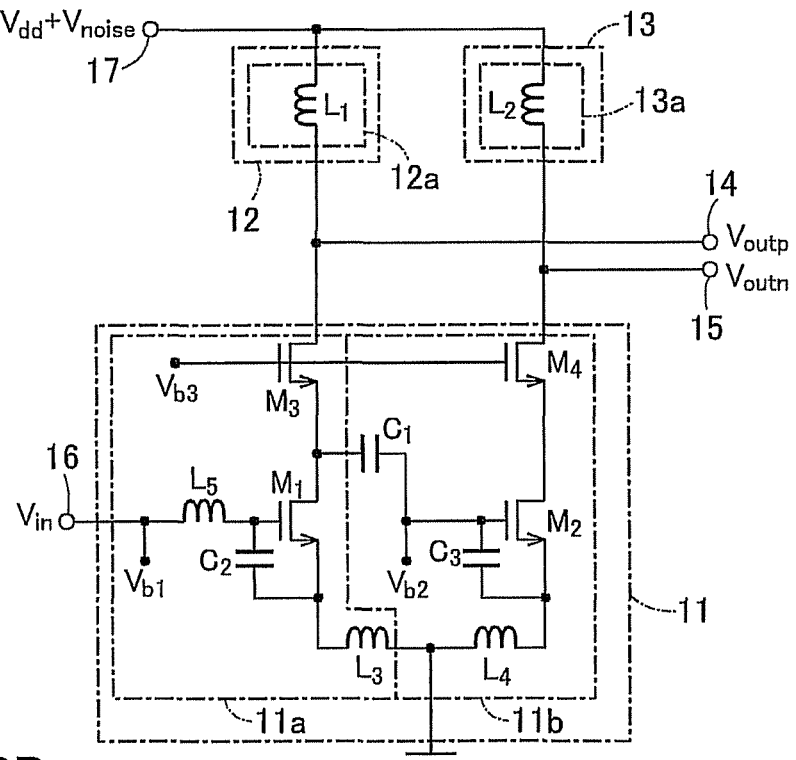

FIG. 3A is a circuit configuration showing an example of the LNA 2. The LNA 2 in FIG. 3A is an example in which the impedance adjusting modules 11c and 12b are respectively provided in the transconductance circuit 11 and the load circuit 12. FIG. 3B is a comparative example in which the impedance adjusting modules 11c and 12b are not provided.

The load 12a in the load circuit 12 has a coil L1 connected between the power supply terminal 17 and the positive output terminal 14. The impedance adjusting module 12b has a resistance R1 connected in parallel with the coil L1. The load circuit 13 has a coil L2 connected between the power supply terminal 17 and the negative output terminal 15.

The current generator 11a in the transconductance circuit 11 has NMOS (N-type Metal-Oxide-Semiconductor) transistors M3 and M1 and a coil L3 which are connected in series between the positive output terminal 14 and the ground terminal, a coil L5 connected between the input terminal 16 and the gate of the NMOS transistor M1, and a capacitor C2 connected between the gate and the source of the NMOS transistor M1. The current generator 11b has NMOS transistors M4 and M2 and a coil L4 which are connected in series between the negative output terminal 15 and the ground terminal, a capacitor C1 connected between a connection node of the NMOS transistors M3 and M1, and the gate of the NMOS transistor M2, and a capacitor C3 connected between the gate and the source of the NMOS transistor M2. The impedance adjusting module 11c has a capacitor C4 connected between a connection node of the NMOS transistors M4 and M2, and the ground terminal.

A predetermined direct current bias Vb3 is applied to the NMOS transistors M3 and M4, and the NMOS transistors M3 and M4 supply currents Ioutp and Ioutn, respectively. The coil L5 and the capacitor C2 adjust the input impedance to, for example, 50 Ω. A predetermined direct current bias Vb1 is applied to one terminal of the coil L5 and the input voltage Vin is superimposed on the direct current bias Vb1. The capacitor C1 cuts a direct current component inputted into the gate of the NMOS transistor M2. The capacitor C3 is provided symmetrically with respect to the capacitor C2. The coils L3 and L4 improve linearity of the circuit.

By inserting the capacitor C4 as the impedance adjusting module 11c, the absolute value as well as the phase of the impedance $Z_{02}$ decreases. By inserting the resistance R1 as the impedance adjusting module 12b, the absolute value of the impedance $Z_{02}$ is decreases. Therefore, for example, the phase of $Z_{01}*Z_{04}$ and the phase of $Z_{02}*Z_{03}$ are adjusted to be the same by the capacitor C4, and further, the absolute values of $Z_{01}*Z_{04}$ and $Z_{02}*Z_{03}$ are adjusted to be the same by the resistance R1. By inserting the capacitor C4, symmetric property with respect to the circuit on the side of the positive output terminal 14 is improved.

Figure 4:
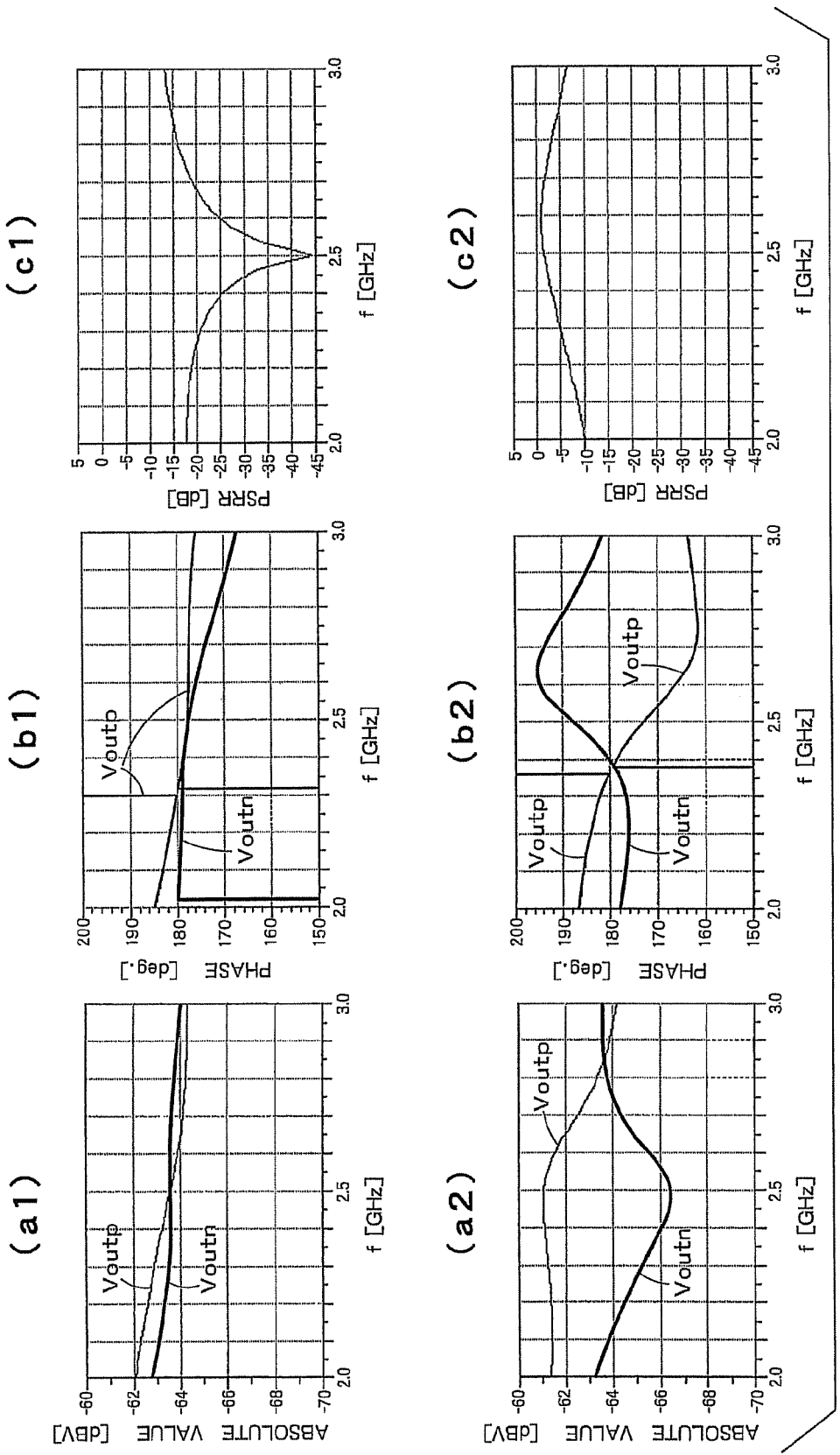
FIG. 4 is a simulation result showing the characteristics of the LNA 2 in FIGS. 3A and 3B.

FIG. 4 is a simulation result showing the characteristics of the LNA 2 in FIGS. 3A and 3B. FIGS. 4(a1), 4(b1), and 4(c1) show simulation results of the LNA 2 of FIG. 3A including the impedance adjusting modules 11c and 12b. FIGS. 4(a2), 4(b2), and 4(c2) show simulation results of the circuit of FIG. 3B that does not include the impedance adjusting modules 11c and 12b. Assuming that the analog circuit operates and suffers power supply noise at 2.5 GHz, the values of the capacitor C4 and the resistance R1 are adjusted so that the PSRR becomes small at this frequency.

The vertical axes in FIGS. 4(a1) and 4(a2) represent absolute values of the output voltages Voutp and Voutn in dBV, and the horizontal axes represent a frequency f of the power supply noise Vnoise. In FIG. 4(a2) which is not provided with the impedance adjusting modules, the absolute value of Voutp is significantly different from the absolute value of Voutn at the frequency of 2.5 GHz. However, in FIG. 4(a1) which is provided with the impedance adjusting modules, these absolute values can be almost the same at the frequency of 2.5 GHz.

The vertical axes in FIGS. 4(b1) and 4(b2) represent the phases of the output voltages Voutp and Voutn, and the horizontal axes represent the frequency f of the power supply noise Vnoise. In FIG. 4(b2), the phase of Voutp is significantly different from the phase of Voutn at the frequency of 2.5 GHz. However, in FIG. 4(b1), these phases can be almost the same at the frequency of 2.5 GHz.

The vertical axes in FIGS. 4(c1) and 4(c2) represent the PSRR in dB, and the horizontal axes represent the frequency f of the power supply noise Vnoise. As shown in FIGS. 4(c1) and 4(c2), the PSRR at the frequency of 2.5 GHz can be improved by 40dB or more by providing the impedance adjusting modules.

Various modifications of specific circuit configuration of the LNA 2 can be conceivable. For example, it is considered that a resistance, a coil, or a capacitor is connected in parallel with the load 12a in the impedance adjusting module 12b provided in the load circuit 12.

FIG. 5 is a schematic block diagram of the LNA 2 in which the load circuit 12 is provided with the impedance adjusting module 12b. As described above, the impedance adjusting module 12b and the load 12a are connected in parallel with each other. The load 12a and the impedance adjusting module 12b are, for example, a resistance, a coil, or a capacitor. When the impedance of the load 12a is $Z_0$ and the impedance of the impedance adjusting module 12b is $Z_{a3}$, the impedance $Z_{03}$ of the load circuit 12 is represented by the following equation (8).

$$Z_{03}=Z_0//Z_{a3} \qquad (8)$$

FIG. 6 is a diagram collectively showing variation of the impedance $Z_{03}$ when the impedance adjusting module 12b is connected to the load 12a.

When the impedance adjusting module 12b is connected in parallel with the load 12a, the absolute value of the impedance $Z_{03}$ is smaller than that in the case where the impedance adjusting module 12b is not provided even if each of the load circuit 12a and the impedance adjusting module 12b are a resistance, a coil, or a capacitor.

When the load 12a is a resistance, if the impedance adjusting module 12b is not provided, the phase is "0". On the other hand, if a coil is connected as the impedance adjusting module 12b, the phase increases, and if a capacitor is connected as the impedance adjusting module 12b, the phase decreases. If a resistance is connected, the phase does not vary.

When the load 12a is a coil, if the impedance adjusting module 12b is not provided, the phase is positive. On the other hand, if a resistance or a capacitor is connected as the impedance adjusting module 12b, the phase decreases. If a coil is connected, the phase does not vary.

When the load 12a is a capacitor, if the impedance adjusting module 12b is not provided, the phase is negative. On the other hand, if a resistance or a coil is connected as the impedance adjusting module 12b, the phase increases. If a capacitor is connected, the phase does not vary.

As described above, the impedance of the load circuit 12 can be adjusted by a simple circuit in which any one of a resistance, a coil, and a capacitor is connected as the impedance adjusting module 12b. Of course, this is the same when the impedance adjusting modules 11c and 13b are provided in the transconductance circuit 11 and the load circuit 13, respectively. When the impedance adjusting module 11c is provided in the transconductance circuit 11, it is desirable that the symmetric property of the circuit is considered as shown in FIG. 3.

Hereinafter, a modified example of the LNA 2 will be described. Although, in the circuit configurations described below, no impedance adjusting module is shown, an impedance adjusting module is connected to at least one of the transconductance circuit 11 and the load circuits 12 and 13 so that the equation (7) is satisfied.

Figure 7:
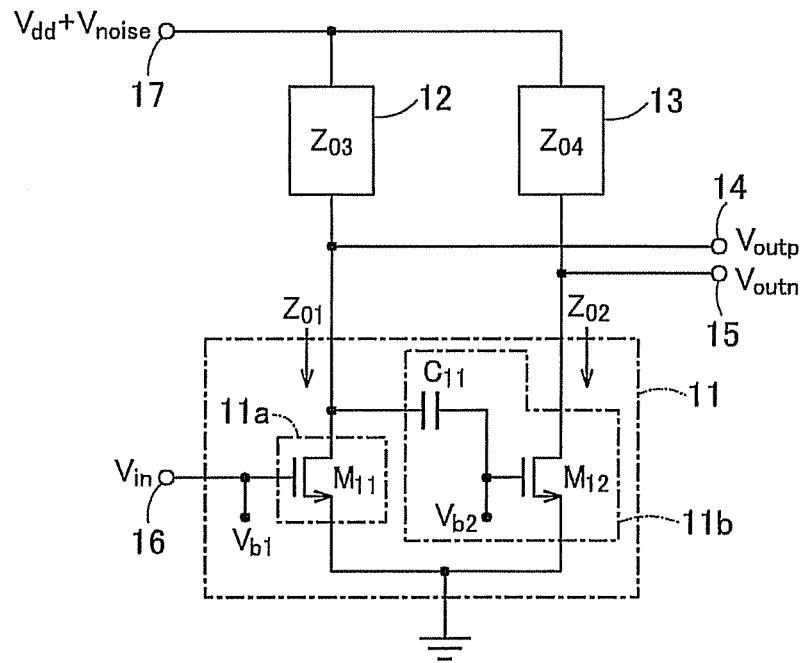
FIG. 7 is a circuit configuration of a first modified example of the LNA 2.

FIG. 7 is a circuit configuration of a first modified example of the LNA 2. The current generator 11a of the transconductance circuit 11 in FIG. 7 has an NMOS transistor M11 connected between the positive output terminal 14 and the ground terminal. The current generator 11b has an NMOS transistor M12 connected between the negative output terminal 15 and the ground terminal, and has a capacitor C11 connected between the positive output terminal 14 and the gate of the NMOS transistor M12.

Figure 8:
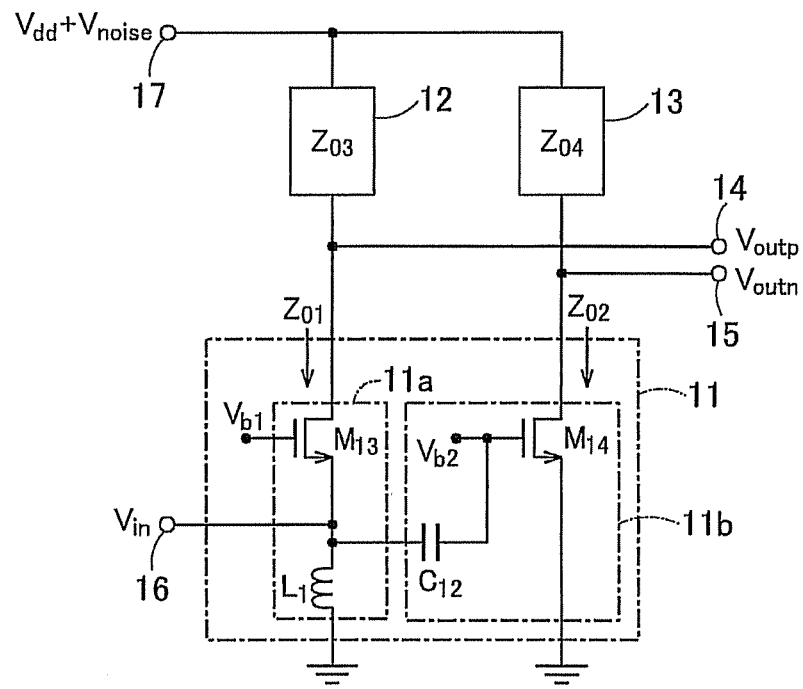
FIG. 8 is a circuit configuration of a second modified example of the LNA 2.

FIG. 8 is a circuit configuration of a second modified example of the LNA 2. The current generator 11a of the transconductance circuit 11 in FIG. 8 has an NMOS transistor M13 and a coil L1 connected between the positive output terminal 14 and the ground terminal. The current generator 11b has an NMOS transistor M14 connected between the negative output terminal 15 and the ground terminal, and has a capacitor C12 connected between the input terminal 16 and the gate of the NMOS transistor M14.

Figure 9:
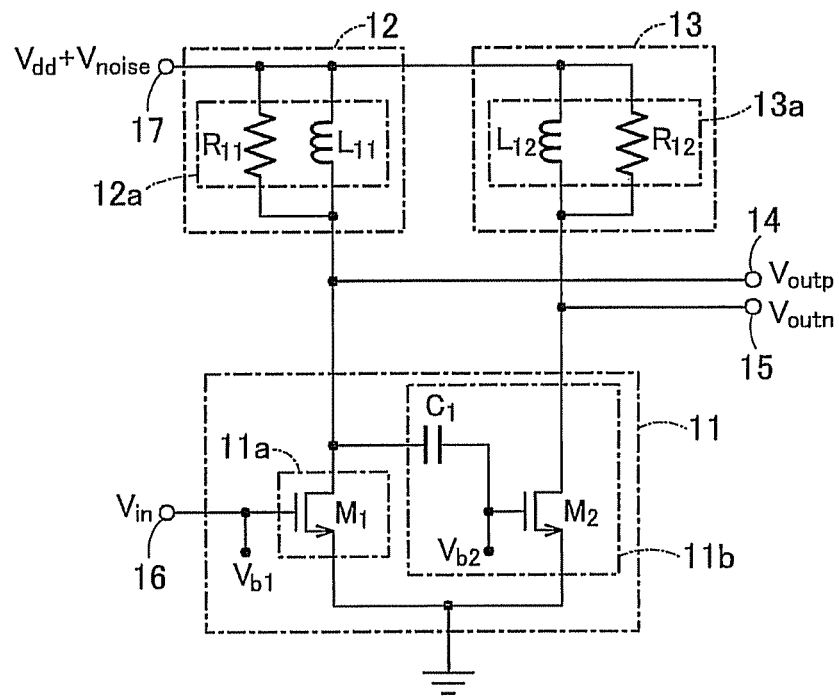
FIG. 9 is a circuit configuration of a third modified example of the LNA 2.

FIG. 9 is a circuit configuration of a third modified example of the LNA 2. The load circuit 12 in FIG. 9 has a coil L11 and a resistance R11 connected in parallel between the power supply terminal 17 and the positive output terminal 14. The load circuit 13 has a coil L12 and a resistance R12 connected in parallel between the power supply terminal 17 and the negative output terminal 15.

Figure 10:
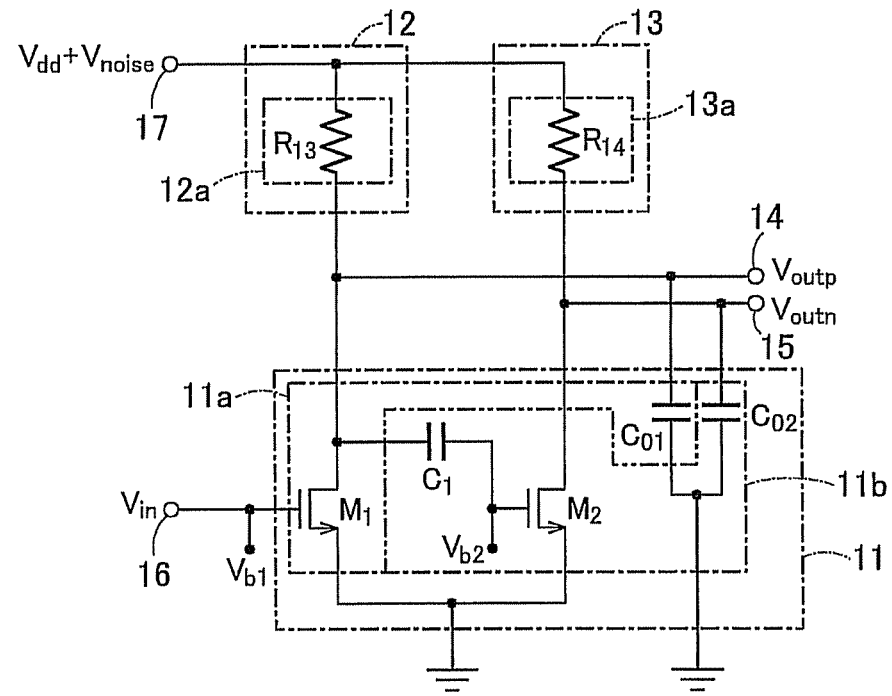
FIG. 10 is a circuit configuration of a fourth modified example of the LNA 2.

FIG. 10 is a circuit configuration of a fourth modified example of the LNA 2. The load circuit 12 in FIG. 10 has a resistance R13 connected between the power supply terminal 17 and the positive output terminal 14. The load circuit 13 has a resistance R14 connected between the power supply terminal 17 and the negative output terminal 15. In addition to elements in FIG. 9, the current generator 11a has a capacitor C01 connected between the positive output terminal 14 and the ground terminal, and the current generator 11b has a capacitor C02 connected between the negative output terminal 15 and the ground terminal.

Further, various modified examples are conceivable, such as, circuits in FIGS. 7 to 10 are properly interchanged.

As described above, in the first embodiment, the impedance adjusting modules are provided in the LNA 2 and the impedances $Z_{01}$ to $Z_{04}$ of each circuit are adjusted so that the equation (7) is satisfied. Therefore, the PSRR can be decreased. Further, since the LNA 2 is a single-end input circuit, the LNA 2 can be realized at low cost. Moreover, the voltage margin for the tail current is unnecessary, and thus, the LNA 2 can operate with low voltage.

(Second Embodiment)

In the first embodiment described above, the impedance adjusting modules having a fixed impedance value are provided. On the other hand, in the second embodiment described below, impedance adjusting modules whose impedance is variable are provided.

Figure 11:
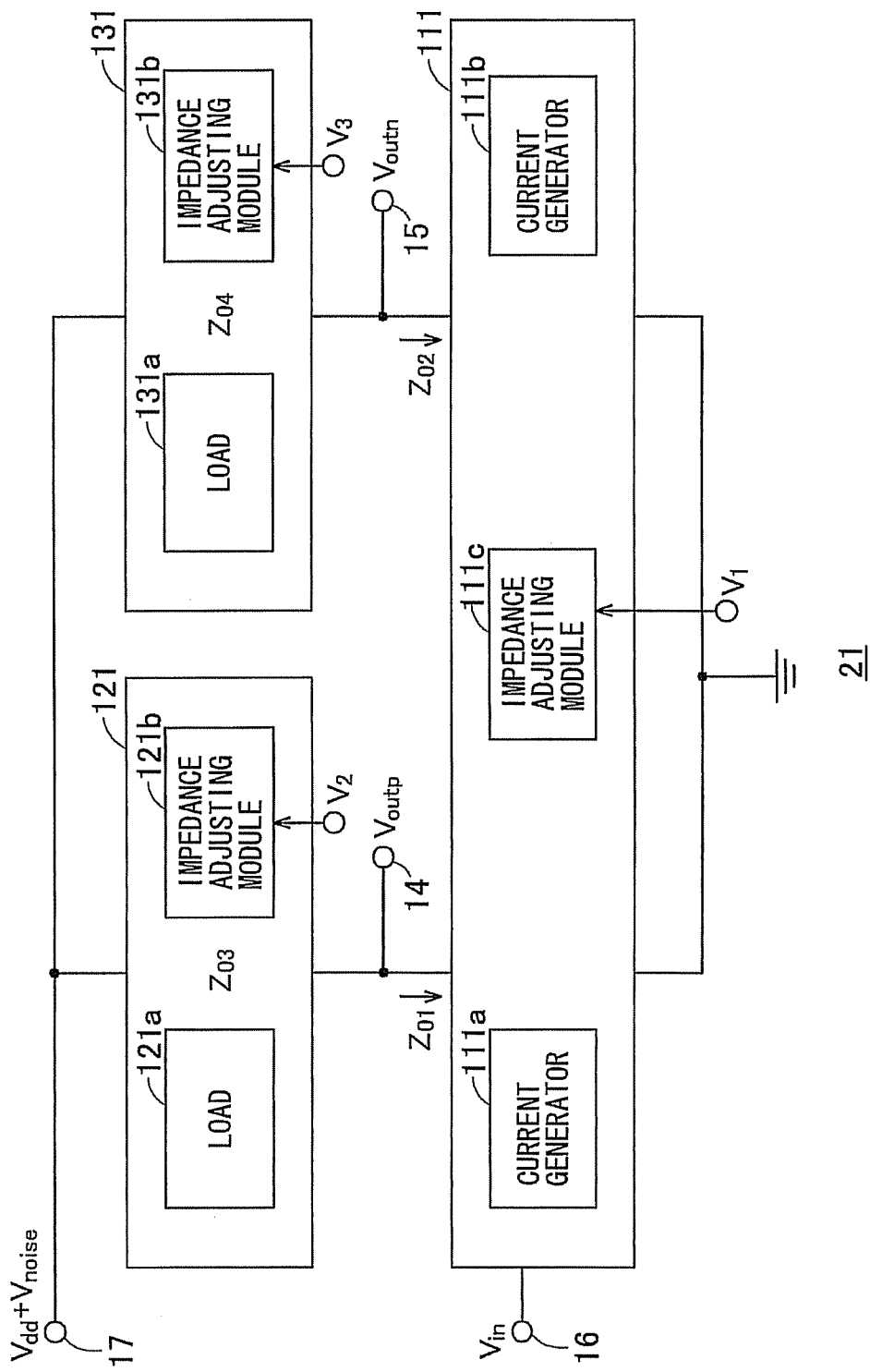
FIG. 11 is a schematic block diagram showing an example of an internal configuration of an LNA 21 according to the second embodiment.

FIG. 11 is a schematic block diagram showing an example of an internal configuration of an LNA 21 according to the second embodiment. In FIG. 11, the same constituent elements as those in FIG. 2 are given by the same reference symbols, and hereinafter, the difference will be mainly described.

Control signals V1 to V3 are respectively inputted into impedance adjusting modules 111c, 121b, and 131b in the LNA 21. The impedances of the impedance adjusting modules 111c, 121b, and 131b can be variably controlled by the control signals V1 to V3. In the same manner as in FIG. 2, at least one of the transconductance circuit 111 and the load circuits 121 and 131 needs to have the impedance adjusting module into which the control signal is inputted.

Even if the LNA 2 in FIG. 2 is designed by providing the impedance adjusting modules so that the equation (7) is satisfied in advance, the equation (7) may not be satisfied because the impedances of each circuit vary due to variation of elements or change in temperature. In the present embodiment, even in such a case, the impedances of the impedance adjusting modules are variably controlled by the control signals V1 to V3, and variation of the impedances are corrected, so that the PSRR can be decreased.

FIG. 12 is a circuit configuration showing an example of the LNA 21. The difference from FIG. 3A is that a varactor capacitance C41 is provided instead of the capacitor C4, and a PMOS transistor M5 is provided instead of the resistance R1. The varactor capacitance C41 is a variable capacitance whose capacitance varies according to the control signal V1. The PMOS transistor M5 is a variable resistance whose resistance varies according to the control signal V2 inputted into the gate.

By using the varactor capacitance, there are some advantages, comparing to using MOM (metal on metal) capacitance controlled by MOS switch, that the capacitance can be continuously controlled within a variable range by which high accuracy can be obtained, and that the dimension of the layout of the varactor capacitance can be decreased.

Furthermore, by using the PMOS transistor, there are some advantages, comparing to using poly-resistance controlled by MOS switch, that the capacitance can be continuously controlled within a variable range by which high accuracy can be obtained, and that the dimension of the layout of the varactor capacitance can be decreased.

FIG. 13 is a simulation result showing the characteristics of the LNA 21 in FIG. 12. The vertical axis represents the PSRR in dB, and the horizontal axis represents a control voltage V2. FIG. 13 is a simulation result of the PSRR with respect to various control voltage V1 assuming that there is no variation of elements. When setting V1 to 0.6 V (not shown in FIGS. 13) and V2 to 0.45 V, the PSRR can be the smallest (−33.9 dB).

FIG. 14 is a Monte Carlo simulation result of the PSRR when there is variation of elements. The vertical axis represents the PSRR in dB and the horizontal axis represents trial number. In FIG. 14, trials are performed 40 times when V1=0.6 V and V2=0.45 V. As shown in FIG. 14, when there is variation of elements, the PSRR may rise. For example, at the trial number 10, the PSRR rises to −14 dB. Therefore, the impedances are optimized by changing the control voltages V1 and V2.

FIG. 15 is a simulation result showing the characteristics of the LNA 21 of the trial number 10. The vertical axis and the horizontal axis are the same as those in FIG. 13. When setting V1 to 1.2 V (not shown in FIG. 15) and V2 to 0.345 V, as shown in FIG. 15, the PSRR is improved to −51.9 dB. In this way, the impedances of the impedance adjusting modules are variably controlled, so that the PSRR can be decreased even when the impedances vary due to variation of elements and the like.

Hereinafter, some examples of the impedance adjusting module will be described.

Figure 16:
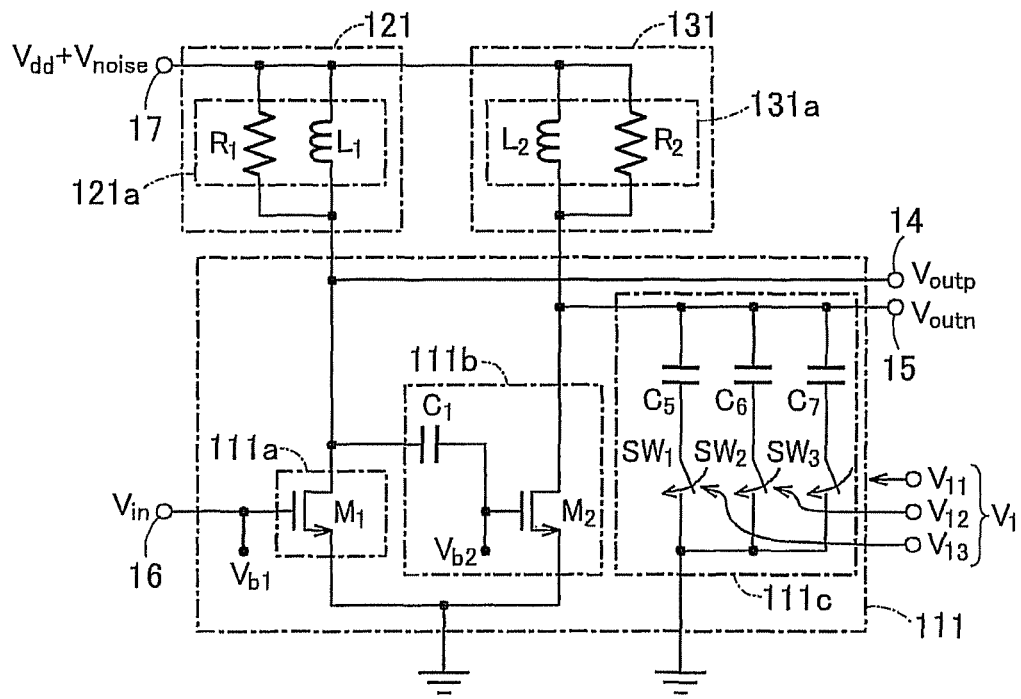
FIG. 16 is a circuit configuration of a first modified example of the LNA 21.

FIG. 16 is a circuit configuration of a first modified example of the LNA 21. In the impedance adjusting module 111c of FIG. 16, a cascade-connected capacitor C5 and a switch SW1, a cascade-connected capacitor C6 and a switch SW2, and a cascade-connected capacitor C7 and a switch SW3, are connected between the positive output terminal 14 and the ground terminal. The switches SW1 to SW3 are controlled according to control signals V11 to V13.

Figure 17:
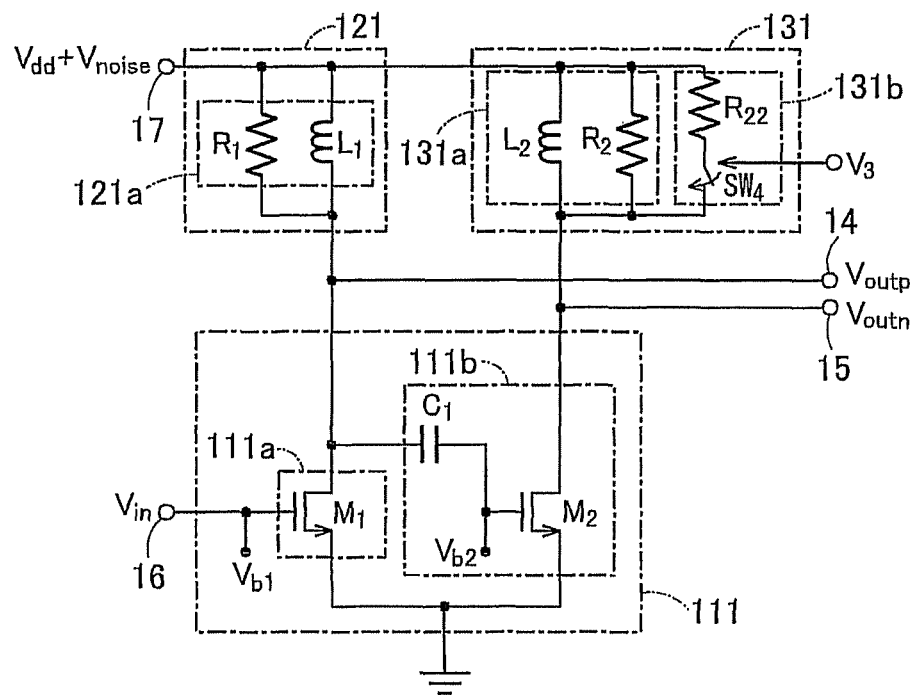
FIG. 17 is a circuit configuration of a second modified example of the LNA 21.

FIG. 17 is a circuit configuration of a second modified example of the LNA 21. The impedance adjusting module 131b in FIG. 17 has a resistance R22 and a switch SW4 cascade-connected between the power supply terminal 17 and the negative output terminal 15. The switch SW4 is controlled according to the control signal V2.

Figure 18:
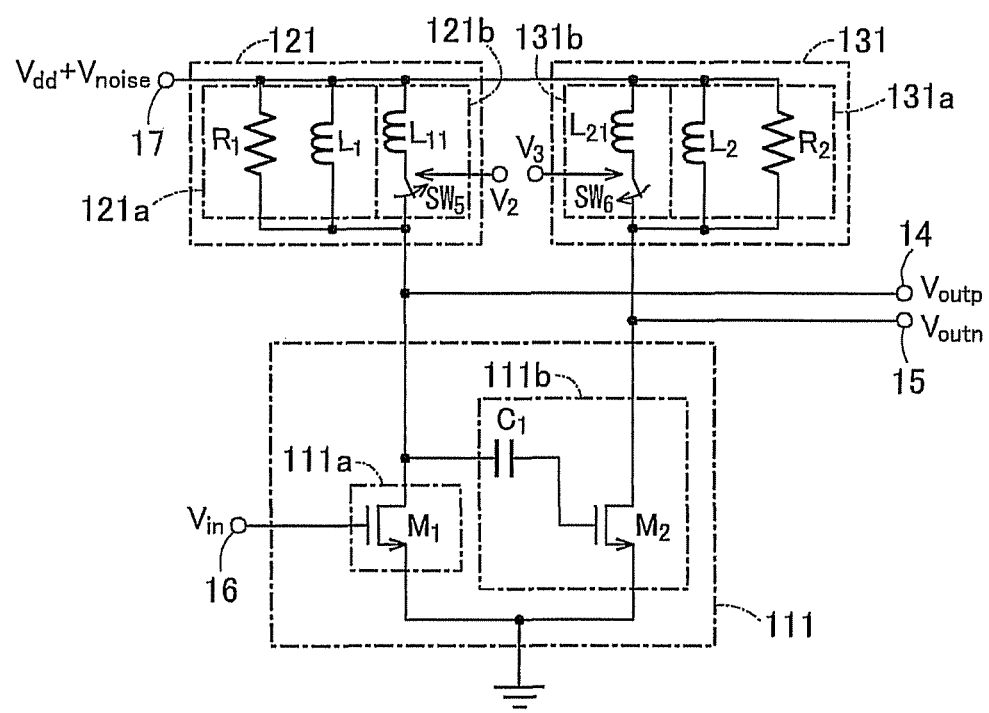
FIG. 18 is a circuit configuration of a third modified example of the LNA 21.

FIG. 18 is a circuit configuration of a third modified example of the LNA 21. The impedance adjusting module 121b in FIG. 18 has a coil L11 and a switch SW5 cascade-connected between the power supply terminal 17 and the positive output terminal 14, and the impedance adjusting module 131b has a coil L21 and a switch SW6 cascade-connected between the power supply terminal 17 and the negative output terminal 15. The switches SW5 and SW6 are controlled according to the control signals V2 and V3.

As shown in FIGS. 16 to 18, the impedances can be variably controlled by turning on and off the switches according to the control signals V1 to V3.

In this way, in the second embodiment, the impedance adjusting modules whose impedance is variable are provided. Therefore, the PSRR can be decreased by adjusting the impedances so that the equation (7) is satisfied even when the impedances of circuits vary due to variation of elements and the like.

(Third Embodiment)

In a third embodiment of the invention, the control signals in the second embodiment are automatically set.

Figure 19:
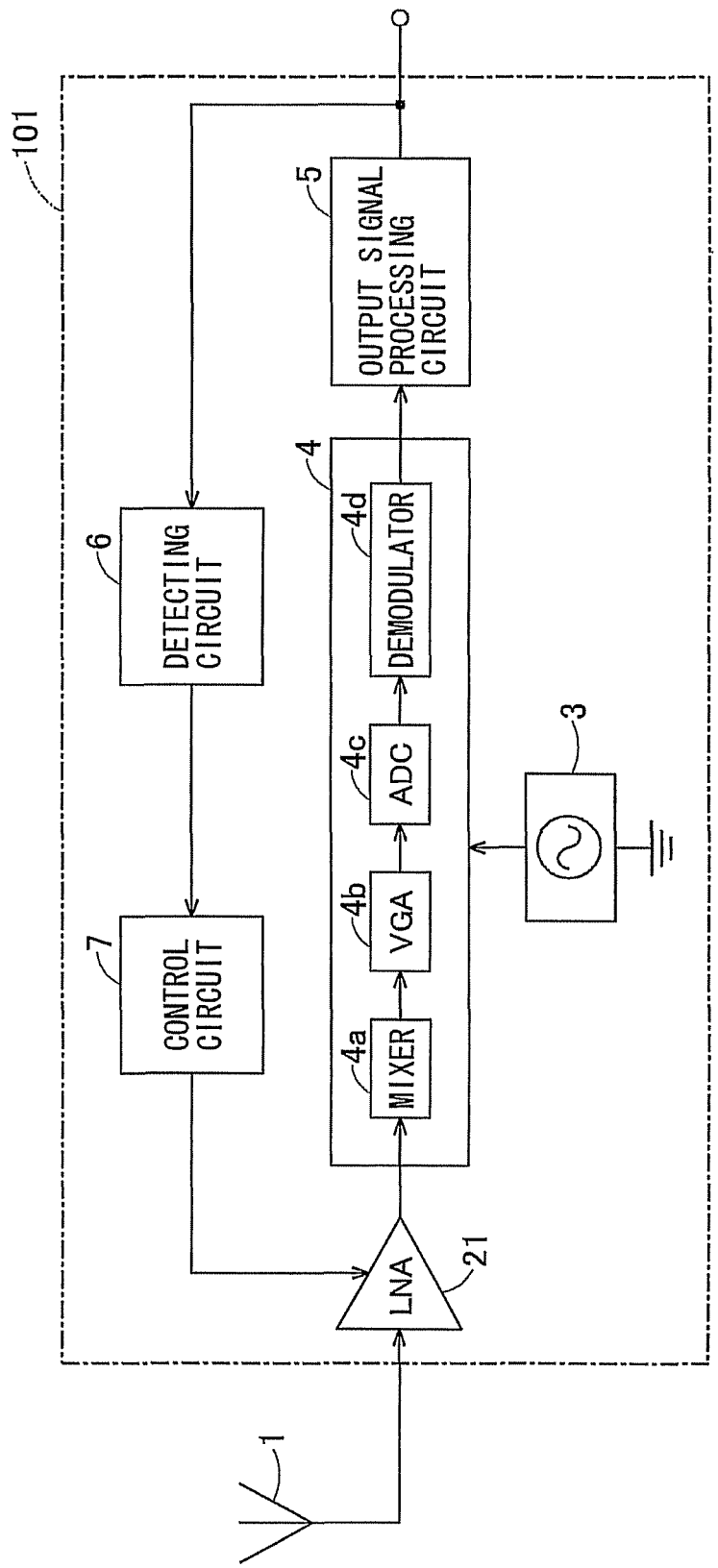
FIG. 19 is a schematic block diagram of a receiving apparatus 101 according to the third embodiment.

FIG. 19 is a schematic block diagram of a receiving apparatus 101 according to the third embodiment. In FIG. 19, the same constituent elements as those in FIG. 1 are given by the same reference numerals, and hereinafter, the difference will be mainly described.

The receiving apparatus 101 in FIG. 19 further includes a detecting circuit 6 and a control circuit 7. The LNA 21 is the one described with reference to FIG. 11 and has at least one impedance adjusting module whose impedance is variably controlled according to the control signals. The detecting circuit 6 detects degradation of the output signal of the output signal processing circuit 5. The control circuit 7 sets the control signals of the LNA 21 so that the degradation of the output signal is suppressed.

For example, the control circuit 7 sets all the control signals to various values and finally sets values by which the degradation of the output signal is most suppressed. Or, the control circuit 7 may firstly adjust the absolute values of the impedances, and then adjust the phases. The control circuit 7 may set the control signals at the time of shipment of the receiving apparatus 101 or may set the control signals each time the receiving apparatus 101 is turned on. Or, the control circuit 7 may monitor the degradation of the output signal at all times and update the control signals in real time.

In this way, in the third embodiment, the detecting circuit 6 and the control circuit 7 are provided, so that the impedances can be automatically adjusted.

The LNAs shown in FIG. 3 and the like are just an example, and various modifications can be conceivable. For example, at least a part of MOS transistors may be formed by other semiconductor devices such as a bipolar transistor and a Bi-CMOS. Further, an LNA may be formed in which the conductivity type of the transistors is inverted and connection positions of the power supply terminal and the ground terminal are reversed accordingly. In this case, the basic principle of operation is the same.

The entire circuit of the LNA and the receiving apparatus according to the present invention may be formed on the same semiconductor substrate, or a part of the circuit may be formed on other semiconductor substrates. The LNA and the receiving apparatus according to the present invention may be mounted on a printed circuit board by using discrete components.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A semiconductor integrated circuit comprising:
a transconductance circuit comprising:
a first current generator configured to generate a first current depending on an input voltage; and
a second current generator configured to generate a second current depending on the input voltage;
a first load circuit comprising a first load configured to output a first output voltage depending on the first current from a first output terminal; and
a second load circuit comprising a second load configured to output a second output voltage depending on the second current from a second output terminal,
wherein at least one of the transconductance circuit, the first load circuit and the second load circuit comprises an impedance adjusting module configured to adjust impedance in such a manner that a parameter "P" shown in a following equation decreases, $$P = Z_{O1} * Z_{O4} - Z_{O2} * Z_{O3}$$

where, the $Z_{O1}$ is impedance of the transconductance circuit seen from the first output terminal,
the $Z_{O2}$ is impedance of the transconductance circuit seen from the second output terminal,
the $Z_{O3}$ is impedance of the first load circuit, and
the $Z_{O4}$ is impedance of the second load circuit.

2. The circuit of claim 1, wherein the impedance adjusting module comprises a resistance, a coil or a capacitor connected to at least one of the first current generator, the second current generator, the first load and the second load.

3. The circuit of claim 1, wherein the impedance adjusting module is capable of adjusting the impedance according to a control signal.

4. The circuit of claim 3, wherein the impedance adjusting module comprises:
a MOS (Metal Oxide Semiconductor) transistor, the control signal being inputted to a gate of the MOS transistor, or
a varactor capacitance whose capacitance is controlled according to the control signal.

5. The circuit of claim 3, wherein the impedance adjusting module comprises:
a resistance, a coil or a capacitor; and
a switch connected to the resistance, the coil or the capacitor in series, the switch being controlled by the control signal.

6. The circuit of claim 1, wherein
the first load comprises a first coil connected between a power supply terminal and the first output terminal,
the second load comprises a second coil connected between the power supply terminal and the second output terminal,
the first current generator comprises:
a first transistor, a second transistor and a third coil connected in series between the first output terminal and a ground terminal;
a fourth coil connected between an input terminal and a control terminal of the second transistor, the input voltage being inputted to the input terminal; and
a first capacitor connected between the control terminal of the second transistor and a first connection node, the first connection node being a connection node between the second transistor and the third coil,
the second current generator comprises:

a third transistor, a fourth transistor and a fifth coil connected in series between the second output terminal and the ground terminal;
a second capacitor connected between a second connection node and a control terminal of the fourth transistor, the second connection node being a connection node between the first transistor and the second transistor; and
a third capacitor connected between the control terminal of the fourth transistor and a third connection node, the third connection node being a connection node between the fourth transistor and the fifth coil.

7. The circuit of claim 6, wherein
the first load circuit comprises a resistance connected in parallel with the first coil, and
the transconductance circuit comprises a fourth capacitor connected between a fourth connection node and the ground terminal, the fourth connection node being a connection node between the third transistor and the fourth transistor.

8. The circuit of claim 1, wherein
the first load comprises a first resistance and a first coil connected in parallel between a power supply terminal and the first output terminal,
the second load comprises a second resistance and a second coil connected in parallel between the power supply terminal and the second output terminal,
the first current generator comprises a first transistor connected between the first output terminal and a ground terminal, and
the second current generator comprises:
a second transistor connected between the second output terminal and the ground terminal; and
a capacitor connected between the first output terminal and a control terminal of the second transistor.

9. The circuit of claim 1, wherein
the first load comprises a first resistance between a power supply terminal and the first output terminal,
the second load comprises a second resistance between the power supply terminal and the second output terminal,
the first current generator comprises a first transistor and a first capacitor connected in parallel between the first output terminal and a ground terminal, and
the second current generator comprises:
a second transistor and a second capacitor connected in parallel between the second output terminal and the ground terminal; and
a capacitor connected between the first output terminal and a control terminal of the second transistor.

10. A receiver apparatus comprises:
a semiconductor integrated circuit configured to amplify a received signal received by an antenna;
a demodulation circuit configured to demodulate the amplified received signal; and
an output signal processing circuit configured to process the demodulated received signal to output the processed received signal to an outside,
wherein the semiconductor integrated circuit comprises:
a transconductance circuit comprising:
a first current generator configured to generate a first current depending on an input voltage of the received signal received by the antenna; and
a second current generator configured to generate a second current depending on the input voltage;
a first load circuit comprising a first load configured to output a first output voltage depending on the first current from a first output terminal; and
a second load circuit comprising a second load configured to output a second output voltage depending on the second current from a second output terminal,
wherein at least one of the transconductance circuit, the first load circuit and the second load circuit comprises an impedance adjusting module configured to adjust impedance in such a manner that a parameter "P" shown in a following equation decreases, $P = Z_{01} * Z_{04} - Z_{02} * Z_{03}$ where, the $Z_{01}$ is impedance of the transconductance circuit seen from the first output terminal,
the $Z_{02}$ is impedance of the transconductance circuit seen from the second output terminal,
the $Z_{03}$ is impedance of the first load circuit, and
the $Z_{04}$ is impedance of the second load circuit.

11. The apparatus of claim 10, wherein the impedance adjusting module comprises a resistance, a coil or a capacitor connected to at least one of the first current generator, the second current generator, the first load and the second load.

12. The apparatus of claim 10, wherein the impedance adjusting module is capable of adjusting the impedance according to a control signal.

13. The apparatus of claim 12 further comprising:
a detecting circuit configured to detect degradation of an output signal of the output signal processing circuit; and
a control circuit configured to set the control signal in such a manner that the degradation of the output signal decreases.

14. The apparatus of claim 12, wherein the impedance adjusting module comprises:
a MOS (Metal Oxide Semiconductor) transistor, the control signal being inputted to a gate of the MOS transistor, or
a varactor capacitance whose capacitance is controlled according to the control signal.

15. The apparatus of claim 12, wherein the impedance adjusting module comprises:
a resistance, a coil or a capacitor; and
a switch connected to the resistance, the coil or the capacitor in series, the switch being controlled by the control signal.

16. The apparatus of claim 10, wherein
the first load comprises a first coil connected between a power supply terminal and the first output terminal,
the second load comprises a second coil connected between the power supply terminal and the second output terminal,
the first current generator comprises:
a first transistor, a second transistor and a third coil connected in series between the first output terminal and a ground terminal;
a fourth coil connected between an input terminal and a control terminal of the second transistor, the input voltage being inputted to the input terminal; and
a first capacitor connected between the control terminal of the second transistor and a first connection node, the first connection node being a connection node between the second transistor and the third coil,
the second current generator comprises:
a third transistor, a fourth transistor and a fifth coil connected in series between the second output terminal and the ground terminal;
a second capacitor connected between a second connection node and a control terminal of the fourth transistor, the second connection node being a connection node between the first transistor and the second transistor; and a third capacitor connected between the control terminal of the fourth transistor and a third connection node, the third connection node being a connection node between the fourth transistor and the fifth coil.

17. The apparatus of claim 16, wherein
the first load circuit comprises a resistance connected in parallel with the first coil, and
the transconductance circuit comprises a fourth capacitor connected between a fourth connection node and the ground terminal, the fourth connection node being a connection node between the third transistor and the fourth transistor.

18. The apparatus of claim 10, wherein
the first load comprises a first resistance and a first coil connected in parallel between a power supply terminal and the first output terminal,
the second load comprises a second resistance and a second coil connected in parallel between the power supply terminal and the second output terminal,
the first current generator comprises a first transistor connected between the first output terminal and a ground terminal, and
the second current generator comprises:
a second transistor connected between the second output terminal and the ground terminal; and
a capacitor connected between the first output terminal and a control terminal of the second transistor.

19. The apparatus of claim 10, wherein
the first load comprises a first resistance between a power supply terminal and the first output terminal,
the second load comprises a second resistance between the power supply terminal and the second output terminal,
the first current generator comprises a first transistor and a first capacitor connected in parallel between the first output terminal and a ground terminal, and
the second current generator comprises:
a second transistor and a second capacitor connected in parallel between the second output terminal and the ground terminal; and
a capacitor connected between the first output terminal and a control terminal of the second transistor.

20. The apparatus of claim 10, wherein the demodulation circuit comprises:
a mixer configured to frequency-convert a signal amplified by the semiconductor integrated circuit;
an amplifier configured to amplify the frequency-converted signal;
an analog to digital converter configured to convert the amplified signal to a digital signal; and
a demodulator configured to demodulate the digital signal to supply the output signal processing circuit with the demodulated digital signal.

* * * * *